US011989861B2

United States Patent
Yang et al.

(10) Patent No.: US 11,989,861 B2
(45) Date of Patent: May 21, 2024

(54) DEEP LEARNING-BASED REAL-TIME DETECTION AND CORRECTION OF COMPROMISED SENSORS IN AUTONOMOUS MACHINES

(71) Applicant: Intel Corporation, Santa Clara, CA (US)

(72) Inventors: Wenlong Yang, Shanghai (CN); Tomer Rider, Naahryia (IL); Xiaopei Zhang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 894 days.

(21) Appl. No.: 15/824,808

(22) Filed: Nov. 28, 2017

(65) Prior Publication Data

US 2019/0025773 A1 Jan. 24, 2019

(51) Int. Cl.
*G06N 3/08* (2023.01)
*G05B 13/02* (2006.01)
(Continued)

(52) U.S. Cl.
CPC ............ *G06T 5/77* (2024.01); *G05B 13/0265* (2013.01); *G06F 18/214* (2023.01); *G06F 18/24* (2023.01); *G06F 18/24133* (2023.01); *G06F 18/251* (2023.01); *G06N 3/045* (2023.01); *G06N 3/08* (2013.01); *G06N 3/084* (2013.01); *G06N 5/04* (2013.01); *G06T 7/0002* (2013.01); *G06V 10/764* (2022.01); *G06V 10/803* (2022.01);
(Continued)

(58) Field of Classification Search
CPC .... G05B 13/0265; G06N 3/084; G06N 20/20; G06N 3/126; G06N 20/00; G06N 5/01; G06F 18/2115; G06F 18/214
See application file for complete search history.

(56) References Cited

U.S. PATENT DOCUMENTS

| 7,609,857 B2 * | 10/2009 | Franz | B60S 1/0822 |
| | | | 382/104 |
| 2019/0149813 A1 * | 5/2019 | Sun | G03B 43/00 |
| | | | 348/187 |

FOREIGN PATENT DOCUMENTS

| CN | 109840586 A | 6/2019 |
| DE | 102018125629 A1 | 5/2019 |
| KR | 20190062171 A | 6/2019 |

OTHER PUBLICATIONS

Dong et al. Camera Anomaly Detection based on Morphological Analysis and Deep Learning, 2016 IEEE International Conference on Digital Signal Processing (DSP), 2016 (Year: 2016).*

(Continued)

*Primary Examiner* — Aniss Chad
*Assistant Examiner* — Shien Ming Chou
(74) *Attorney, Agent, or Firm* — JAFFERY WATSON MENDOSA HAMILTON LLP

(57) ABSTRACT

A mechanism is described for facilitating deep learning-based real-time detection and correction of compromised sensors in autonomous machines according to one embodiment. An apparatus of embodiments, as described herein, includes detection and capturing logic to facilitate one or more sensors to capture one or more images of a scene, where an image of the one or more images is determined to be unclear, where the one or more sensors include one or more cameras. The apparatus further comprises classification and prediction logic to facilitate a deep learning model to identify, in real-time, a sensor associated with the image.

9 Claims, 9 Drawing Sheets

(51) Int. Cl.
| | |
|---|---|
| *G06F 18/214* | (2023.01) |
| *G06F 18/24* | (2023.01) |
| *G06F 18/2413* | (2023.01) |
| *G06F 18/25* | (2023.01) |
| *G06N 3/045* | (2023.01) |
| *G06N 3/084* | (2023.01) |
| *G06N 5/04* | (2023.01) |
| *G06T 5/77* | (2024.01) |
| *G06T 7/00* | (2017.01) |
| *G06V 10/764* | (2022.01) |
| *G06V 10/80* | (2022.01) |
| *G06V 10/82* | (2022.01) |
| *G06V 10/98* | (2022.01) |
| *G05D 1/00* | (2006.01) |
| *G06N 3/044* | (2023.01) |

(52) U.S. Cl.
CPC .......... *G06V 10/82* (2022.01); *G06V 10/993* (2022.01); *G05D 1/00* (2013.01); *G06N 3/044* (2023.01); *G06T 2207/20081* (2013.01); *G06T 2207/20084* (2013.01); *G06T 2207/30168* (2013.01)

(56) References Cited

OTHER PUBLICATIONS

Mora, Real-time Image Recovery Using Temporal Image Fusion, IEEE International Conference of Fuzzy Systems, FUZZ-IEEE, 2013 (Year: 2013).*

Baroffio, Camera Identification with Deep Convolutional Networks, ResearchGate, 2016 (Year: 2016).*

Intel Core i5 Desktop Processors Comparison Chart, Intel. 2020 (Year: 2020).*

Abroyan, Convolutional and Recurrent Neural Networks for Real-time Data Classification, 2017 Seventh International Conference on Innovative Computing Technology(INTECH) (Year: 2017).*

Roumeliotis, Sensor Fault Detection and Identification in a Mobile Robot, 1998 IEEE/RSJ International Conference on Intelligent Robots and Systems. Innovation in Theory, Practice and Applications (Year: 1998).*

Fu, Credit Card Fraud Detection Using Convolutional Neural Networks, 2016 Neural Information Processing, pp. 483-490, 2016 (Year: 2016).*

Fu, Credit Card Fraud Detection Using Convolutional Neural Network, 2016 Neural Information Processing, pp. 483-490, 2016 (Year: 2016).*

Fu et. al, Credit Card Fraud Detection Using Convolutional Neural Network, 2016 Neural Information Processing, pp. 483-490, 2016 (Year: 2016).*

Shaw, what are real-time embedded systems, Real-Time System and Software, Wiley, 2001 (Year: 2001).*

Wang, Deep Learning in Real Time Inference Acceleration and Continuous Training, SyncedReview, 2017 (Year: 2017).*

Realpe et. al. Sensor Fault Detection and Diagnosis for autonomous vehicles, MATEC Web of Conferences, 2015 (Year: 2015).*

English Translation of The Notice of Preliminary Rejection, Korean Patent Appln. No 2018-0128300 (Docket No. AA1885-US-KR), mailed Jan. 25, 2024, 5 pages.

Miguel Realpe, et al., "Sensor Fault Detection and Diagnosis for autonomous vehicles," ICMSET 2015 (released on Nov. 4, 2015).

Lingping Dong, et al., "Camera anomaly detection based on morphological analysis and deep learning," 2016 IEEE International Conference on Digital Signal Processing (released on Oct. 16, 2016).

English Translation of The Notice of Preliminary Rejection, German Patent Appln. No 10 2018 125 629.9 (Docket No. AA1885-US-DE), mailed 02/025/2024, 5 pages.

* cited by examiner

DEEP LEARNING-BASED REAL-TIME DETECTION AND CORRECTION OF COMPROMISED SENSORS IN AUTONOMOUS MACHINES

FIELD

Embodiments described herein relate generally to data processing and more particularly to facilitate deep learning-based real-time detection and correction of compromised sensors in autonomous machines.

BACKGROUND

Autonomous machines are expected to grow exponentially in the coming years which, in turn, is likely to require sensors, such as cameras, to lead the growth in terms of facilitating various tasks, such as autonomous driving.

Conventional techniques use multiple sensors to attempt to apply data/sensor fusion for providing some redundancy to guarantee the accuracy; however, these conventional techniques are severely limited in that they are incapable of dealing with or getting around those sensors that provide low quality or misleading data.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
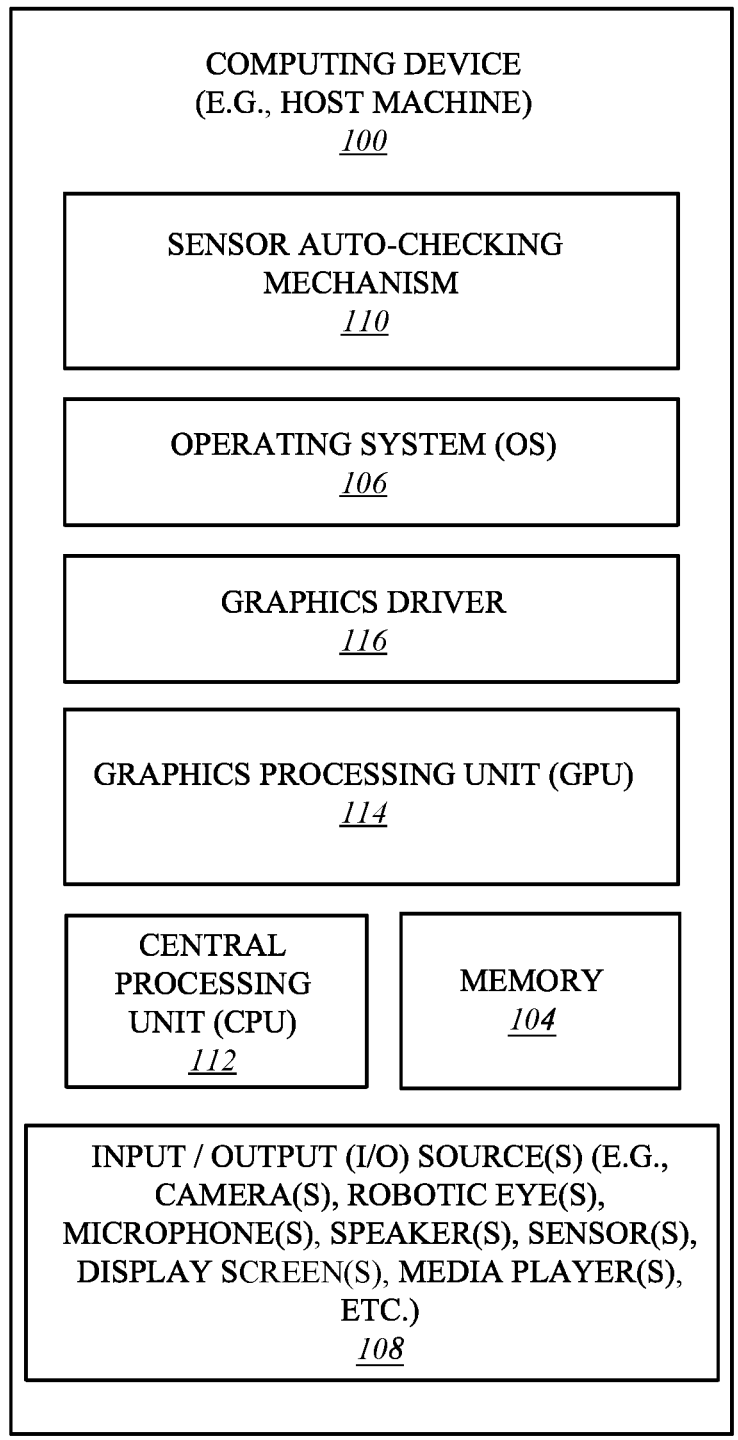
FIG. 1 illustrates a computing device employing a sensor auto-checking mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for deep learning-based detection, notification, correction of compromised sensors in autonomous machines. In one embodiment, auto-checking may include one or more of detection of compromised sensors, issuing alerts to warn of the compromised sensors, offering to fix, in real-time, any distortions of compromised sensors, and/or the like.

It is contemplated that embodiments are not limited to any number or type of sensors; however, for the sake of brevity, clarity, and ease of understanding, one or more cameras may be used as exemplary sensors throughout this document, but embodiments are not limited as such.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a sensor auto-checking mechanism ("auto-checking mechanism") 110 according to one embodiment. Computing device 100 represents a communication and data processing device including or representing any number and type of smart devices, such as (without limitation) smart command devices or intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, etc.

In some embodiments, computing device 100 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, network devices, drivers, or the like, as well as input/output (I/O) sources 108, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, as illustrated, auto-checking mechanism 110 may be hosted by operating system 106 in communication with I/O source(s) 108 of computing device 100. In another embodiment, auto-checking mechanism 110 may be hosted or facilitated by graphics driver 116. In yet another embodiment, auto-checking mechanism 110 may be hosted by or part of graphics processing unit ("GPU" or simply graphics processor") 114 or firmware of graphics processor 114. For example, auto-checking mechanism 110 may be embedded in or implemented as part of the processing hardware of graphics processor 114. Similarly, in yet another embodiment, auto-checking mechanism 110 may be hosted by or part of central processing unit ("CPU" or simply "application processor") 112. For example, auto-checking mechanism 110 may be embedded in or implemented as part of the processing hardware of application processor 112.

In yet another embodiment, auto-checking mechanism 110 may be hosted by or part of any number and type of components of computing device 100, such as a portion of auto-checking mechanism 110 may be hosted by or part of operating system 116, another portion may be hosted by or part of graphics processor 114, another portion may be hosted by or part of application processor 112, while one or more portions of auto-checking mechanism 110 may be hosted by or part of operating system 116 and/or any number and type of devices of computing device 100. It is contemplated that embodiments are not limited to any particular implementation or hosting of auto-checking mechanism 110 and that one or more portions or components of auto-checking mechanism 110 may be employed or implemented as hardware, software, or any combination thereof, such as firmware.

Computing device 100 may host network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
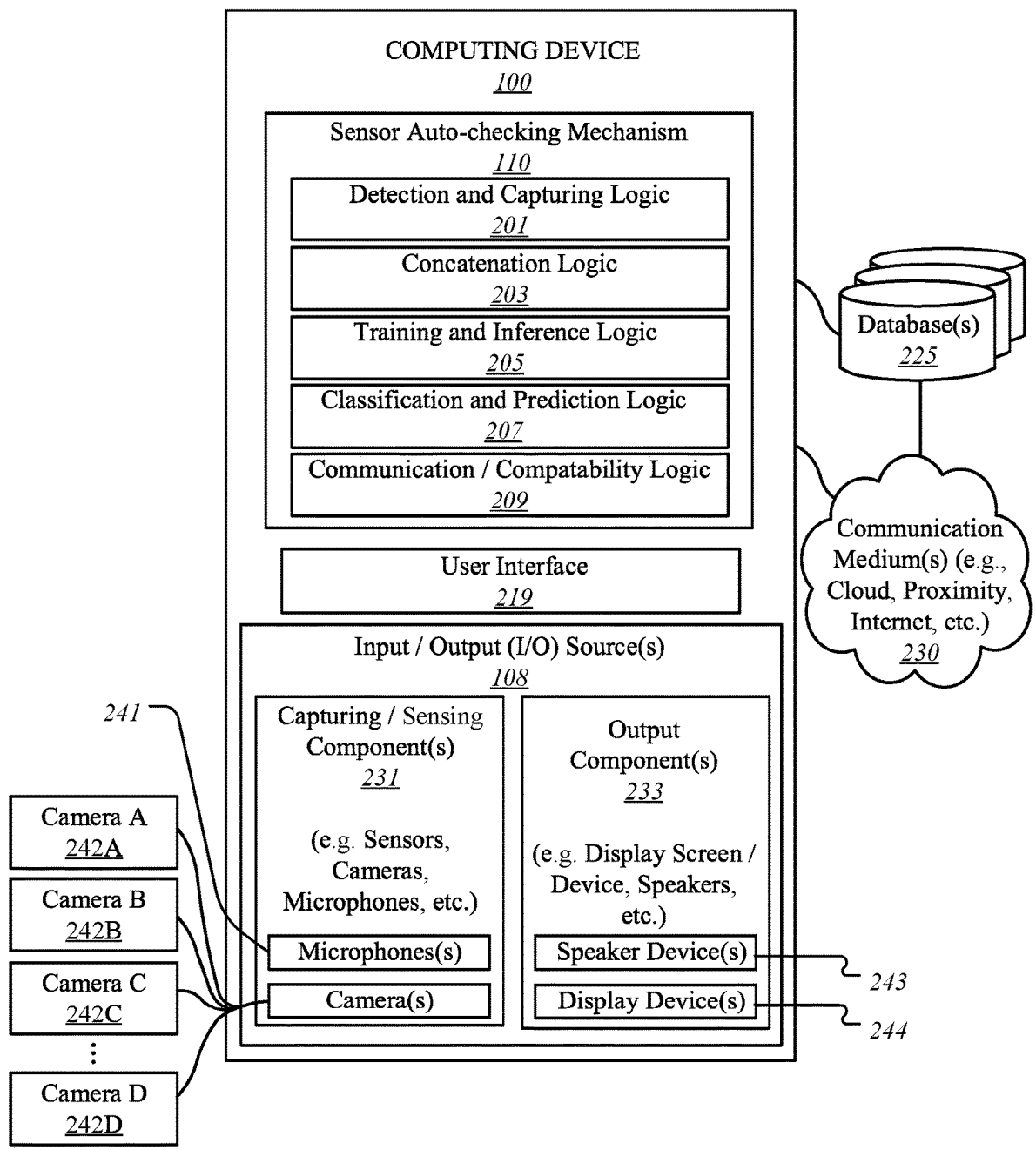
FIG. 2 illustrates the sensor auto-checking mechanism of FIG. 1 according to one embodiment.

FIG. 2 illustrates sensor auto-checking mechanism 110 of FIG. 1 according to one embodiment. For brevity, many of the details already discussed with reference to FIG. 1 are not repeated or discussed hereafter. In one embodiment, auto-checking mechanism 110 may include any number and type of components, such as (without limitations): detection and capturing logic 201; concatenation logic 203; training and inference logic 205; communication/compatibility logic 209; and classification and prediction logic 207.

Computing device 100 (also interchangeably referenced as "autonomous machine" throughout the document) is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having capturing/sensing component(s) 231, such as camera(s) A 242A, B 242B, C 242C, D 242D (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s) 243, etc.

Computing device 100 is further illustrated as having access to and/or being in communication with one or more database(s) 225 and/or one or more of other computing devices over one or more communication medium(s) 230 (e.g., networks such as a cloud network, a proximity network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O sources 108 including capturing/sensing component(s) 231 and output component(s) 233. In one embodiment, capturing/sensing component(s) 231 may include a sensor array including, but not limited to, microphone(s) 241 (e.g., ultrasound microphones), camera(s) 242A-242D (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of speaker(s) 243, display device(s) 244 (e.g., screens, projectors, light-emitting diodes (LEDs)), and/or vibration motors, etc.

For example, as illustrated, capturing/sensing component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242A-242D serve as one or more input devices for detecting and capturing of image and/or videos of scenes, objects, etc., and provide the captured data as video inputs into computing device 100.

It is contemplated that embodiments are not limited to any number or type of microphone(s) 241, camera(s) 242A-242D, speaker(s) 243, display(s) 244, etc. For example, as facilitated by detection and capturing logic 201, one or more of microphone(s) 241 may be used to detect speech or sound simultaneously from multiple users or speakers, such as speaker 250. Similarly, as facilitated by detection and capturing logic 201, one or more of camera(s) 242A-242D may be used to capture images or videos of a geographic location (such as a room) and its contents (e.g., furniture, electronic devices, humans, animals, plats, etc.) and form a set of images or a video stream form the captured data for further processing by auto-checking mechanism 110 at computing device 100.

Similarly, as illustrated, output component(s) 233 may include any number and type of speaker(s) 243 to serve as output devices for outputting or giving out audio from computing device 100 for any number or type of reasons, such as human hearing or consumption. For example, speaker(s) 243 work the opposite of microphone(s) 241 where speaker(s) 243 convert electric signals into sound.

As mentioned previously, embodiments are not limited to any number or type of sensors that are part of, embedded in, or coupled to capturing/sensing component(s) 231, such as microphones 241, cameras 242A-242D, and/or the like. In other words, embodiments are applicable to and compatible with any number type of sensors; however, cameras 242A-242D are used as examples throughout this document for the purposes of discussion with brevity and clarity. Similarly, embodiments are applicable with all types and manner of cameras and thus cameras 242A-242D do not have to be of a certain type.

As aforementioned, with the growth of autonomous machines, such as self-driving vehicles, drones, household appliances, etc., sensors of all sorts are expected to lead the way to influence and facilitate certain tasks that are essential for the viability of autonomous machines, such as sensors serving as the eyes behind the wheel in case of self-driving vehicles. As such, data quality becomes a critical factor when dealing with autonomous machines for any number of reasons, such as safety, security, trust, etc.; particularly, in life-and-death situations, business environments, etc.

It is contemplated that high-quality data can ensure the artificial intelligence (AI) of an autonomous machine, such as computing device 100, receives high-quality inputs (e.g., images, videos, etc.) for outputting high-quality performance. It is further contemplated that even if one of the sensors, such as cameras 242A-242D, is defective or not performing to its full potential (such as due to mud on its lens or too much fog, etc.), the overall performance of computing device 100 could suffer as its accuracy is compromised.

For example, auto-checking mechanism 110 provides for a novel technique for filtering through cameras 242A-242D to detect any abnormalities with any one or more of cameras 242A-242D that may be responsible or have the potential for offering less than high-quality inputs, where such abnormalities in or with cameras 242A-242D may include (without limitation) dirt/mud on lenses, obstacles before lenses, occultations (e.g., fog), physical damage technical issues, and/or the like.

Conventional techniques are incapable of detecting such abnormalities and thus cannot guarantee accuracy of data being collected by sensors of autonomous machines, which often leads to low-quality data or even misleading data.

Embodiments provide for a novel technique for real-time detection of abnormalities with sensors, such as cameras 242A-242D, issuance of alert or warning, as necessitated, and fixing or repairing of such abnormalities. In one embodiment, auto-checking mechanism 110 provides for a novel technique for sensors automatic checking (SAC) for detection and checking on the status of each sensor, such as cameras 242A-242D, in a system, such as autonomous machine 100, to ensure all sensors are working well before any tasks are undertaken (such as prior to driving a self-driving car) and continue to check on the sensors to make certain they go on working or in case of any abnormalities, they are fixed in real-time during performance of any of the tasks (such as driving).

In one embodiment, auto-checking mechanism 110 uses deep learning of autonomous machine 100 to ensure, real-time, cameras 242A-242D and any other sensors are in working condition or that they are at least immediately attended to and fixed in case of any issues. As will be further described later in this document, auto-checking mechanism 110 may use deep neural networks (DNNs), such as convolutional deep learning classifiers of convolutional neural networks (CNNs), to continuously and accurately check on the real-time status of cameras 242A-242D and other sensors and then use the training data to detect and predict which of cameras 242A-242D or other sensors may possibly be broken or out of commission.

One of the major weaknesses with conventional techniques is when a camera lens gets covered with debris, such as dirt, stain, mud, etc., because when that happens, no matter the level or about of debris, there remains no ability for the camera to detect or capture.

Embodiments provide for the use of deep learning on autonomous machines, such as autonomous machine 100, to handle complex matters, such as in case of stain or mud on the lens of a camera, such as camera 242A, this obstruction may be continuously observed including considering any movements or changes associated with camera 242A, the stain, and/or the scene. This is detected and observed in real-time so that the defective or obstructed camera 242A may fixed.

In one embodiment, detection and capturing logic 201 of auto-checking mechanism 110 may be used to trigger one or more cameras 242A-242D, located at various positions, to capture one or more scenes in front of them. It is contemplated that in some embodiments, as illustrated with respect to FIG. 3A, there may be multiple cameras 242A-242D fixed in their locations capturing static inputs, such as capturing the scene from different angles at the same time. Similarly, as illustrated in FIG. 3B, in another embodiment, a single camera, such as camera 242A, may be used to capture dynamic inputs, such as capturing the scene from the same angel at different points in time. In yet another input, as illustrated with respect to FIG. 3C, the stain or debris itself may be dynamic or moving and so a camera, such as camera 242B, may be used to capture the scene while capturing the movement of the debris.

As discussed above, sensors of capturing/sensing components 231 are not merely limited to any number or type of cameras 242A-242D or microphones 241 and that sensors may further include other sensors, such as Light Detection and Ranging (LiDAR) sensors, ultrasonic sensors, and any number and type of other sensors mentioned or described throughout this document and that any input from such sensors may be inputted into a neural network, such as to a softmax layer of a CNN, for classification purposes.

Referring back to auto-checking mechanism 110, as one or more cameras 242A-242D are capturing a scene, any internal or external issues with any of cameras 242A-242D may also be detected, where internal issues include any physical defect (such as part of the lens or camera is broken) or technical issues (such as camera stops working), while external issues relate to any form of obstruction, such as snow, trees, dirt, mud, debris, persons, animals, etc., that could be on the lens or in view of the lens blocking the view of the scene.

For example, if some mud is found on the lens of camera 242A, detection and capturing logic 201 may be triggered to detect that mud or at least that the view from camera 242A is somehow blocked. In case of any movements associated with any of camera 242A, the scene (such as people moving, ocean waves, traffic movement, etc.), and/or the mud itself (such as flowing downwards or in the direct of the wind, etc.), detection and capturing logic 201 may collect such data that includes information relating to the blockage of the view from camera 242A as well as any one or more movements mentioned above.

Once the data is collected by detection and capturing logic 201, it is then forwarded on to concatenation logic 203 as inputs. As mentioned above, embodiments are not limited to camera inputs and that such inputs may come from other sensors and include LiDAR inputs, radar inputs, microphone inputs, and/or the like, where there may be some degree of overlapping in detections of the same object from such sensors. In one embodiment, in case of multiple inputs from multiple sensors, such as two or more of cameras 242A-242D at the same time or over different points in time and/or from the same or different angles, and/or the same sensor, such as camera 242A, over multiple points in time and/or from the same or different angles, concatenation logic 203 may then be triggered to concatenate (or concat) these inputs into a single input.

In one embodiment, any concatenated input of multiple inputs may then be forwarded on to a deep learning neural network model, such as a CNN, for training and interference by training and inference logic 205. In one embodiment, concatenation logic 203 performs concatenation outside of or prior to the data being handled by the deep learning model so that there is better and flexibility to set their orders to further benefit the training process. It is contemplated that embodiments are not limited to any number and type of deep learning models such that a CNN may be any sort or type of CNN commonly used, such as AlexNet, GoogLeNet, RESNET, and/or the like.

It is contemplated that a deep learning neural network/model, such as a CNN, refers to a combination of artificial neural network for analyzing, training, and inferring any range of input data. For example, a CNN is much faster and may necessitate relatively less processing of data compared to conventional algorithms. It is further contemplated that once the input data is received at a CNN, the data may then be processed through layers, such as convolutional layer, a pooling layer, a Rectified Linear Unit (ReLU) layer, a fully connected layer, a loss/output layer, etc., where each layer performs specific processing tasks for training and inferring purposes.

For example, a convolutional layer may be regarded as a core layer having a number of learnable filters or kernels with receptive fields, extending through the full depth of the input volume. This convolutional layer is where the processing of any data from the inputs may get started and move on to another layer, such as pooling layer, where a form of non-linear down-sampling is performed, where, for example, these non-linear down-sampling functions may implement pooling, such as max pooling. Similarly, the data is further process and trained at ReLU layer, which applies the non-saturating activation function to increase nonlinear properties of the decision function and the network without impacting the receptive fields of the convolution layer.

Although embodiments are not limited to any number or types of layers of a neural network, such as a CNN, the training process may continue with the fully connected layer where after several convolutional and pooling layers, high-level reasoning is provided. In other words, a CNN may receive input data and perform feature mapping, sampling, convolutions, sub-sampling, followed by output results.

For example, a loss/output layer may specify how training penalizes the deviation between the predicted labels and true labels, where this loss/output layer may be regarded as the last layer in the CNN. For example, softmax loss may be used for predicting a single class of mutually exclusive classes. Further, in one embodiment, classification and prediction logic 207 for example, softmax and classification layers of loss/output layer may be used for classification and prediction purposed where the two layers are generated by softmax layer and classification layer functions, respectively.

In one embodiment, after having process all the data from inputs for training and inference, classification and prediction logic 207 may then be used to identify which of the sensors, such as cameras 242A-242D, may have problems. Once identified, classification and prediction logic 207 may put out a notification regarding the bad one of cameras 242A-242D, such as display the notification at display device(s) 244, sound it through speaker device(s) 243, etc. In one embodiment, this notification may then be used, such as by a user, to get to the defective one of cameras 242A-242D and fix the problem, such as wipe off the mud from the lens, manually or automatically fix any technical glitch with the lens, replace the defective one of cameras 242-242D with another one, and/or the like.

In one embodiment, certain labels may be used for notification purposes, such as label: 0 may mean all sensors are fine, while label: 1 may mean first sensor is damaged, label: 2 may indicate second sensor is damaged, label: 3 may mean third sensor is damaged, label: 4 may indicate fourth sensor is damaged, and so on. Similarly, label: 1 may indicate first sensor is fine, label: 2 may indicate second sensor is fine, and/or the like. It is contemplated that embodiments are not limited to any form of notification and that anyone or combination of words, numbers, images, videos, audio, etc., may be used to convey the results of sensors being working well or not.

Further, for example, with a single input data layer associated with each of cameras 242A-242D, a number of channels, such as 12 (3*4=12) channels in case of four cameras 242A-242D, may provide for all the data of four images corresponding to four cameras 242A-242D, where this data may be loaded randomly by disrupting the order of channels. Using this data, a deep learning model, such as a CNN, may calculate loss (during training) and accuracy (during validation), so when comes prediction, there may not be a need to use labels. In some embodiments, training data may include a large sample of images, such as thousands or tens of thousands of sample images per camera 242A-242D, while validation data may also include a large sample of images, such as hundreds or thousands of samples images per camera 242A-242D, and/or the like, to provide for a robust training/inferencing of data as facilitated by training and inference data, which is then followed by accurate results, including identifications, predictions, etc., as facilitated by classification and prediction logic 207.

Capturing/sensing component(s) 231 may further include any number and type of camera(s) 242A, 242B, 242C, 242D, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Capturing/sensing component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing component(s) 231 may further include one or more of supporting or supplemental devices for capturing and/or sensing of data, such as illuminators (e.g., IR illuminator), light fixtures, generators, sound blockers, etc.

It is further contemplated that in one embodiment, capturing/sensing component(s) 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Capturing/sensing component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any particular number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "sensors", "cameras", "autonomous machines", "sensor automatic checking", "deep learning", "convolution neural network", "concatenating", "training", "inferencing", "classifying", "predicting", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from auto-checking mechanism 110 to facilitate various embodiments including adding, removing, and/or enhancing certain features. For brevity, clarity, and ease of understanding of auto-checking mechanism 110, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

Figure 3A:
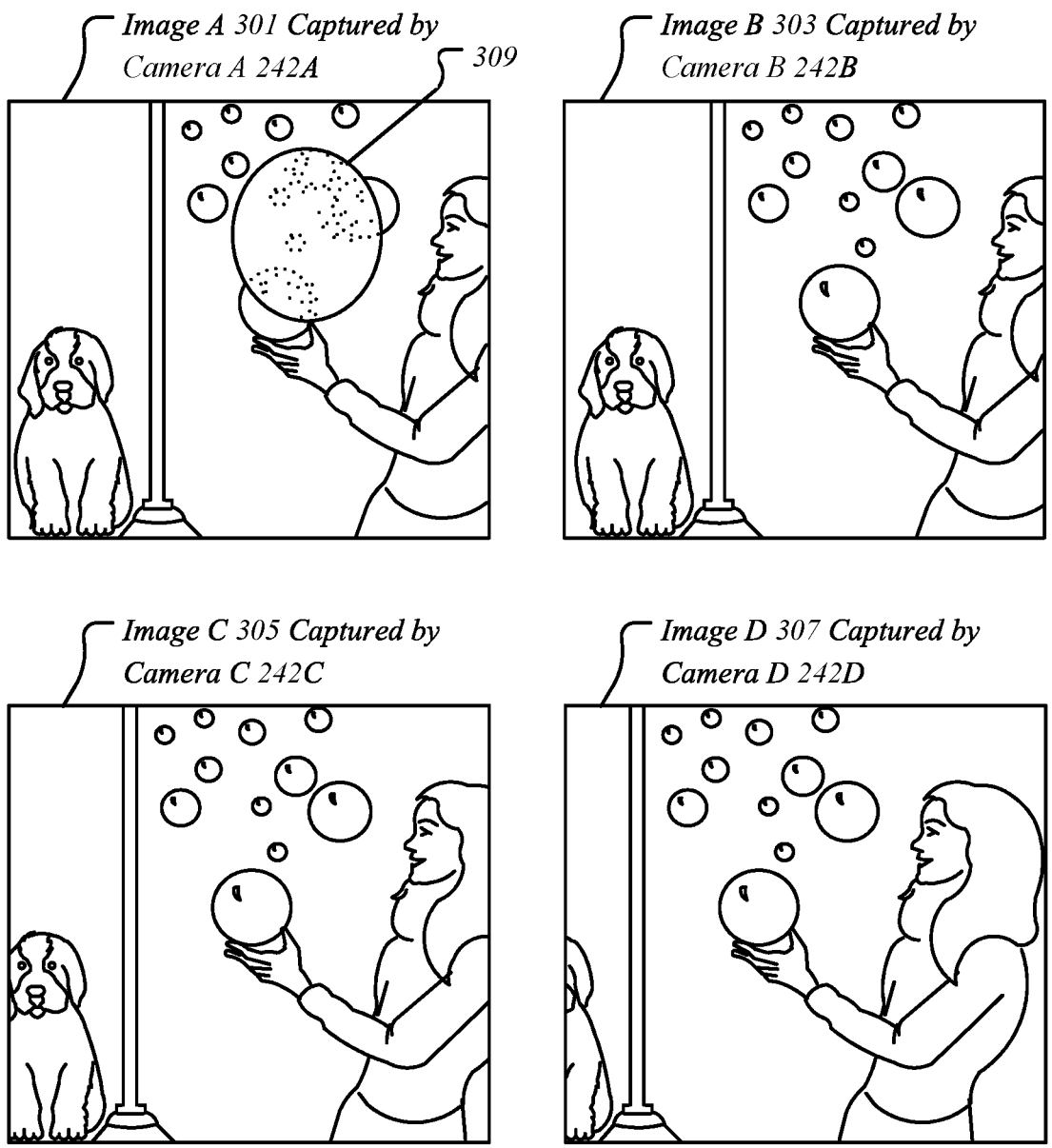
FIG. 3A illustrates static inputs from multiple sensors according to one embodiment.
Figure 3B:
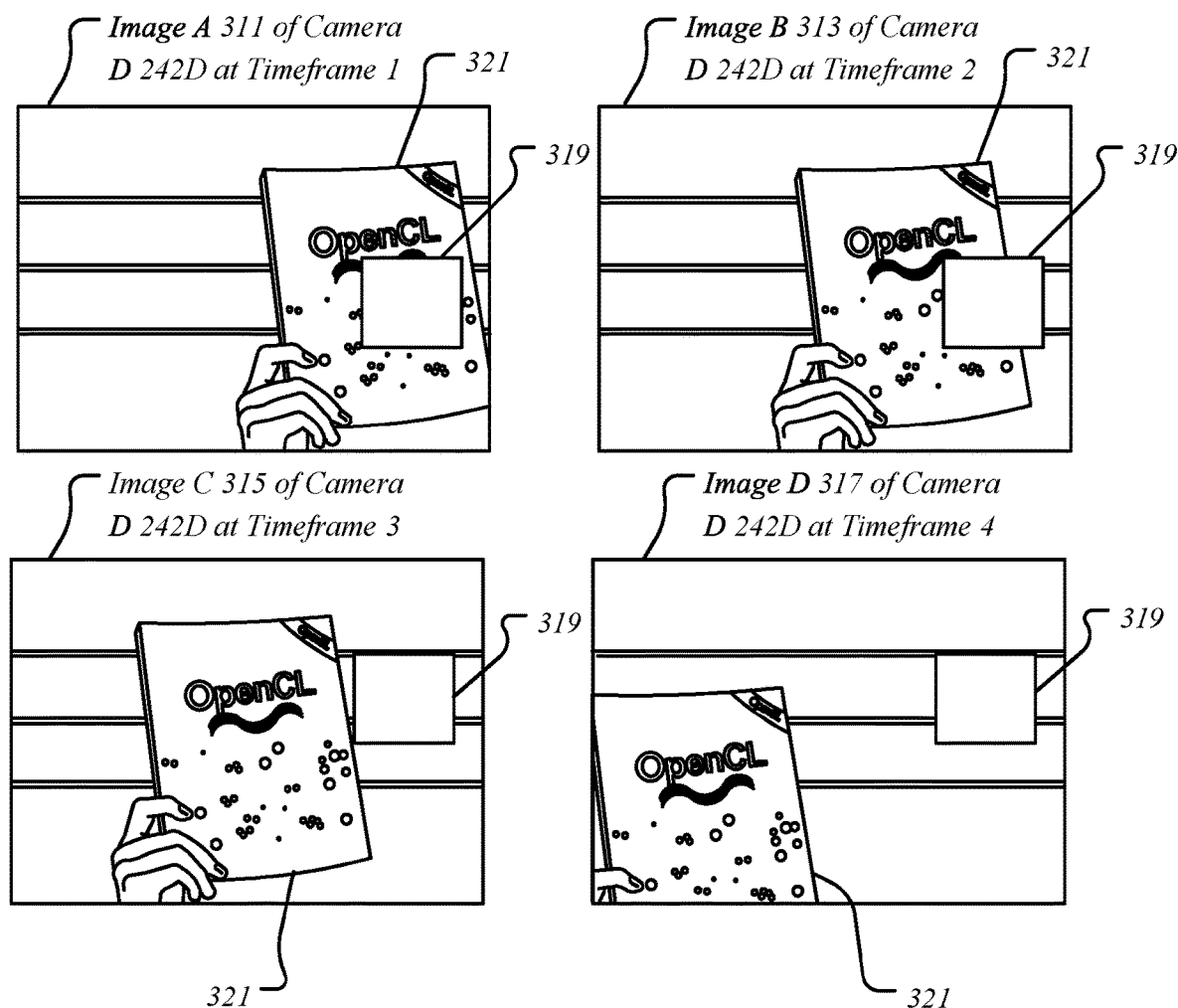
FIG. 3B illustrates dynamic inputs from a single sensor according to one embodiment.

FIG. 3A illustrates static inputs from multiple sensors according to one embodiment and as previously described with reference to FIG. 2. For brevity, many of the details previously discussed with reference to FIGS. 1-2 may not be discussed or repeated hereafter.

In the illustrated embodiment, four images A 301, B 303, C 305, and D 307 of a scene are shown as captured by four cameras A 242A, B 242B, C 242C, and D 242D, respectively, of FIG. 2, where these multiple images 301-307 are based on static data captured by four cameras 242A-242D over a length of time. For example, sensors, such as cameras 242A-242D, radars, etc., may be used to capture similar data for the same purpose of sensing, such as for the automated driving vehicles to be aware of the objects near or around them.

In this embodiment, to simply for design and test, four cameras 242A-242D are shown as capturing four images 301-307 of the same scene and at the same time, but from different angles and/or positions. Further, as illustrated, one of the images, such as image 301, shows the corresponding camera 242A having clarity issues, such as due to some sort of stain 309 (e.g., mud, dirt, debris, etc.) on the lens of camera 242A. It is contemplated that such issues can lead to a great deal of issues when dealing with autonomous machines, such as a self-driving vehicle.

In one embodiment, as discussed with reference to FIG. 2, by collecting a large amount of data, such as thousands of data inputs, and using them as training data, validation data, etc., in deep learning models, such as CNNs, as facilitated by auto-checking mechanism 110 of FIG. 1 allows for real-time detection of stain 309. This real-time detection then allows for real-time notification as real-time correction of stain 309 so that any defects with regard to camera 242A may be fixed and all cameras 242A-242D may function to their potential and collect data to make the use of autonomous machines, such as autonomous machine 100 of FIG. 1, safe, secure, and efficient.

FIG. 3B illustrates dynamic inputs from a single sensor according to one embodiment and as previously described with reference to FIG. 2. For brevity, many of the details previously discussed with reference to FIGS. 1-3A may not be discussed or repeated hereafter.

In this illustrated embodiment, a single sensor, such as camera D 242D of FIG. 2, may be used to capture four images A 311, B 313, C 315, D 317 of a single scene, but with different timestamps, such as at different points in time. In this illustrated pattern, capturing the scene at different points in time show the scene as moving, such as from right to left, while stain 319 is shown as being placed in one location, such as in one spot on the lens of camera D 242D.

Figure 3C:
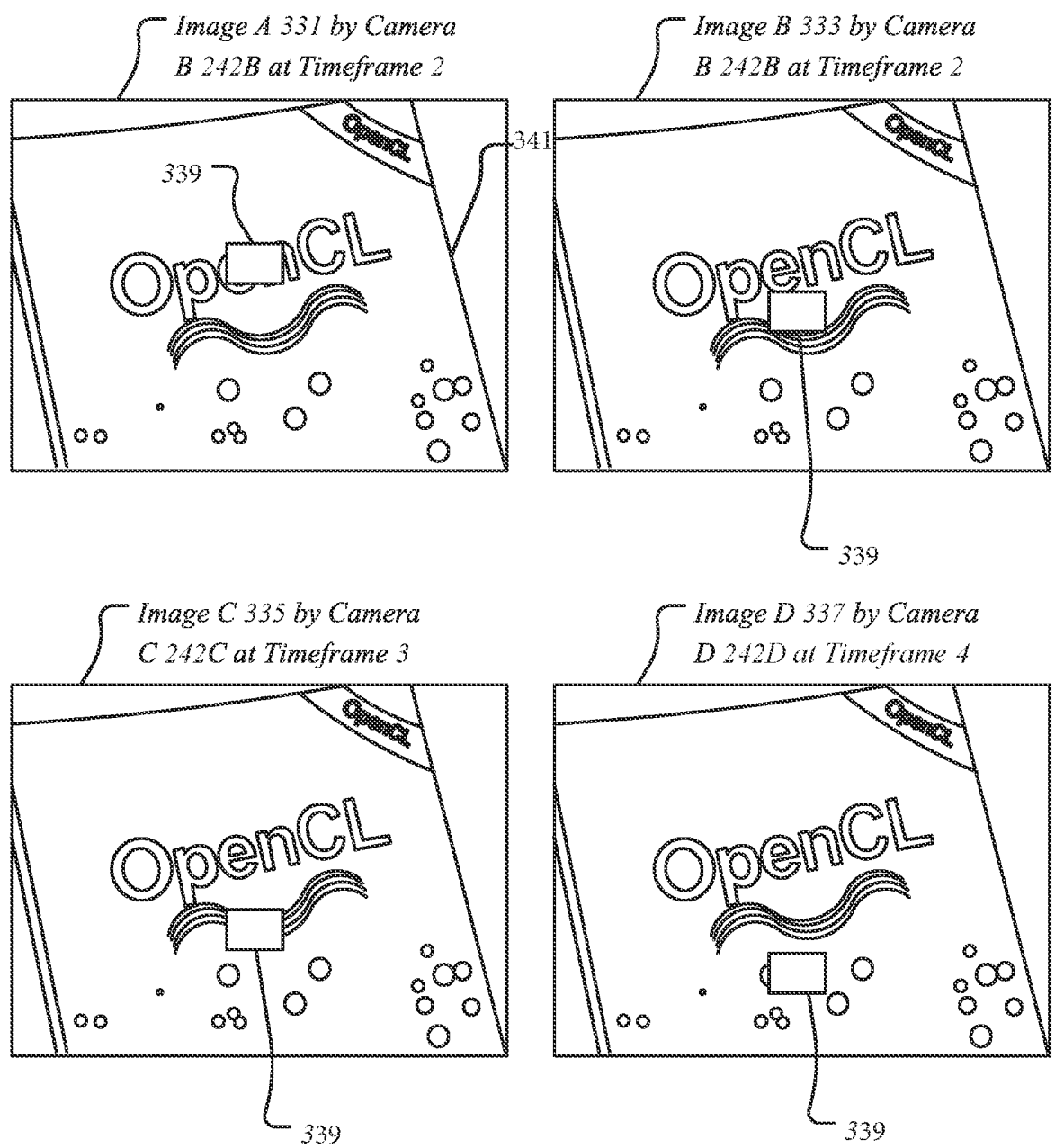
FIG. 3C illustrates dynamic inputs from a single sensor according to one embodiment.

As revealed in four images 311-317, as time goes by, object 321 (e.g., book) as captured by camera 242D seems to be moving (such as from right to left), while stain 319 is fixed (or in real sense, moving slowly on in a different pattern as illustrated in the embodiment of FIG. 3C). As described with reference to FIGS. 2 and 3A, several thousands of images are collected and inputted into a deep learning model for training and validation purposes, which then results in testing of the deep learning model. Once tested, the deep learning model may be used for real-time identification and correction of problems with sensors, such as stain 319 on camera 242D.

FIG. 3C illustrates dynamic inputs from a single sensor according to one embodiment and as previously described with reference to FIG. 2. For brevity, many of the details previously discussed with reference to FIGS. 1-3B may not be discussed or repeated hereafter.

In one embodiment, as described with reference to FIG. 3B in terms of having dynamic inputs through a single sensor, in this illustrated embodiment, a single sensor, such as camera B 242B captures four images A 331, B 333, C 335, D 337 of a single scene, where stain 339 on the lens of camera 242B is shown as moving with object 341 (e.g., book) in the background scene. For example, stain 339 be a piece of mud on the lens of camera 242B that over time draws downward due to gravity or sideways due to winds, movements of camera 242B, and/or the like.

In one embodiment, as previously described, this data relating to stain 339 and its movements may be captured through one or more sensors, such as camera 242B itself, and inputted into a trained deep learning neural network/model, such as a CNN, which then predicts and provides, in real-time, the exact location of stain 339, the sensor impacted by stain 339, such as camera 242B, and how to correct this issue, such as how to remove stain 339 from the lens of camera 242B.

In one embodiment, this training of deep learning neural networks/models is achieved through inputs of collection of (thousands) of such inputs as examples for training and validation of data and testing of deep learning models. For example, a deep learning model may first extract features of all sensors, such as camera 242B, using deep learning neural networks, such as a CNN, and then fuse the data and use a classifier to identify the sensors that are problematic, such as camera 242B. For example, camera 242B may be assigned a label, such as label 2: second sensor is damaged, and/or the like.

Figure 4A:
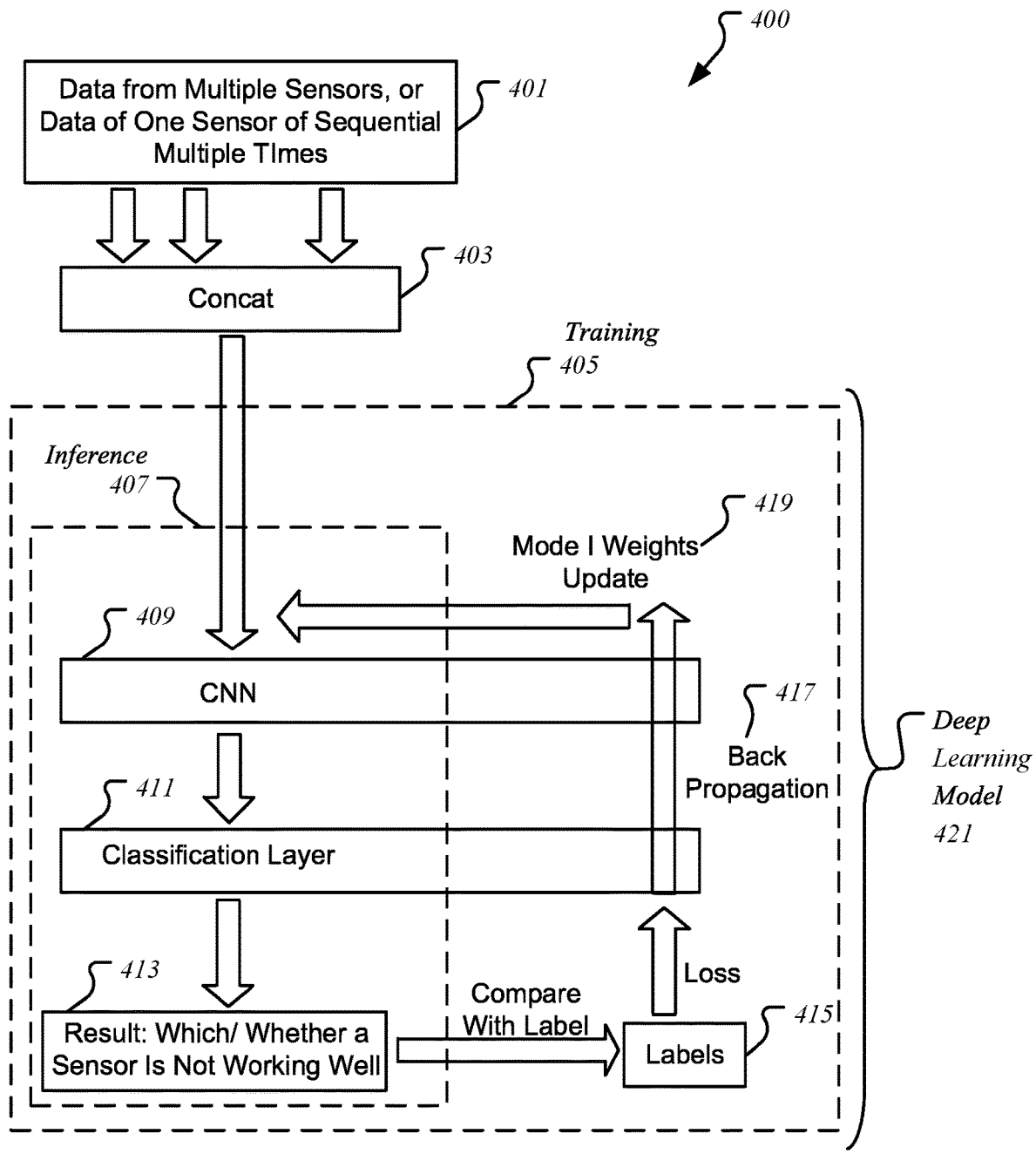
FIG. 4A illustrates an architectural setup offering a transaction sequence for real-time detection and correction of compromised sensors using deep learning according to one embodiment.

FIG. 4A illustrates an architectural setup 400 offering a transaction sequence for real-time detection and correction of compromised sensors using deep learning according to one embodiment. For brevity, many of the details previously discussed with reference to FIGS. 1-3C may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by auto-checking mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

In one embodiment, the transaction sequence at architectural setup 400 begins at 401 with inputting of captured data from one or more sensors of sequential multiple times for concatenation prior to inputting it into a deep learning model, such as deep learning model 421. This data may include multiple inputs based on data captured by any number and type of sensors, such as cameras, LiDARs, radars, etc., while there is some degree of overlapping in their detections (such as when detecting the same object in a scene). At 403, as described with reference to concatenation logic 203 of FIG. 2, data from these inputs sent for concatenation such that these multiple inputs are then concatenated into a single input and sent to data learning model 421 for training 405 and inferencing 407.

It is contemplated that in one embodiment, concatenation is performed outside of or prior to sending the data to deep learning model 421 so that there is better flexibility with respect to setting of orders to gain maximum benefit from training 405. As illustrated, in one embodiment, inferencing 407 may be part of training 405 or, in another embodiment, inferencing 407 and training 405 may be performed separately.

In one embodiment, once inputted into deep learning model 421, it is then inputted into and processed by CNN 409, where the processing of the data passes through multiple layers as further described with reference to FIG. 2. For example, at classification layer 411 may include a common classification layer, such as fully connected layers, softmax layer, and/or the like, as further described with reference to FIG. 2.

In one embodiment, the transaction sequence as offered by architectural setup 400 may continue with results 413 obtained through an output layer, where results 413 may identify or predict whether one or more sensors are technically defective or obstructed by an object or debris or not working for any reason. Once results 413 have been obtained, various labels 415 are compared to determine the loss and the appropriate label to offer to the user regarding the one or more defective sensors. The transaction sequence may continue with back propagation 417 of data and consequently, more weight updates 419 are performed, all at deep learning model 421.

Figure 4B:
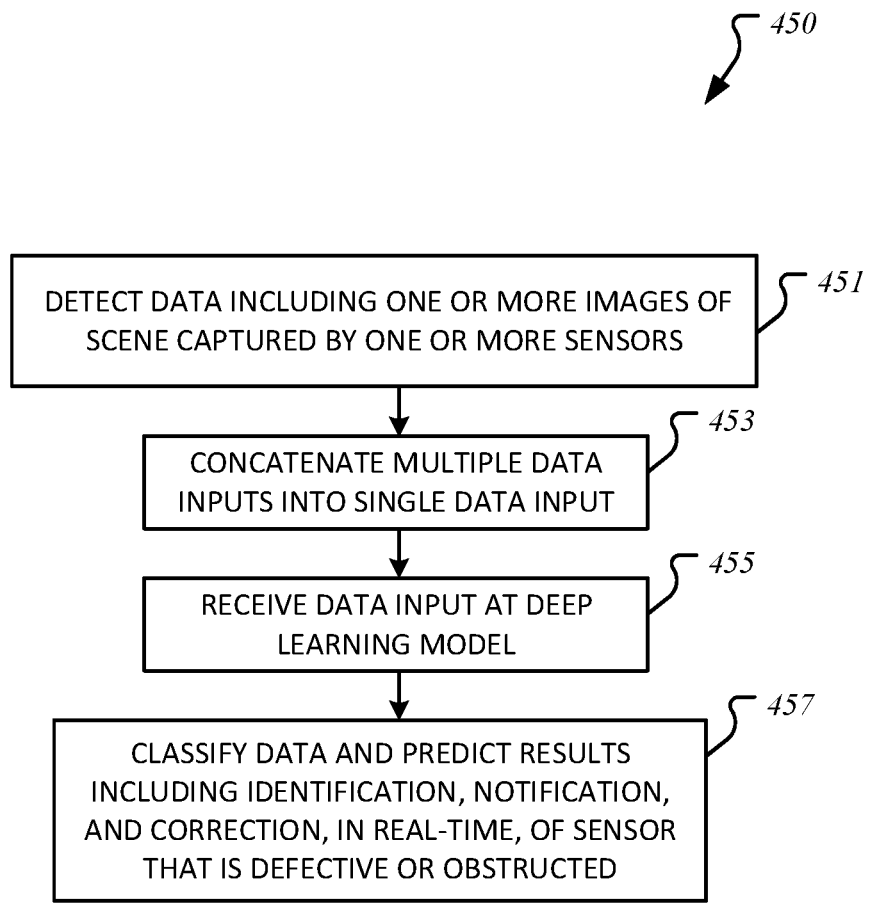
FIG. 4B illustrates a method for real-time detection and correction of compromised sensors using deep learning according to one embodiment.

FIG. 4B illustrates a method 450 for real-time detection and correction of compromised sensors using deep learning according to one embodiment. For brevity, many of the details previously discussed with reference to FIGS. 1-4A may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by auto-checking mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

Method 450 begins at block 451 with detection of data including one or more images of a scene captured by one or more sensors (e.g., cameras) at the same time or over a period of time, where in case of this data being spread over multiple inputs, these multiple inputs are offered for concatenation. At block 453, these multiple inputs are concatenated into a single input of data and offered to a deep learning model for further processing, such as training, inferencing, validation, etc. At block 455, this data is received at the deep learning model for training and inferencing, where the deep learning model includes a neural network (such as a CNN) having multiple processing layers.

It is contemplated and as discussed with reference to FIG. 2, the data passing through training and inferencing stages may be processed and modified at several levels, including at the CNN which may include multiple processing layers of its own. In one embodiment, at block 457, a trained deep learning model classifies the data and predicts the results based on all the processing and classification. For example, the prediction of results may indicate and identify, in real-time, whether any of the one or more sensors is defective or obstructed so that defective or obstructed sensor may be fixed in real-time.

Figure 5:
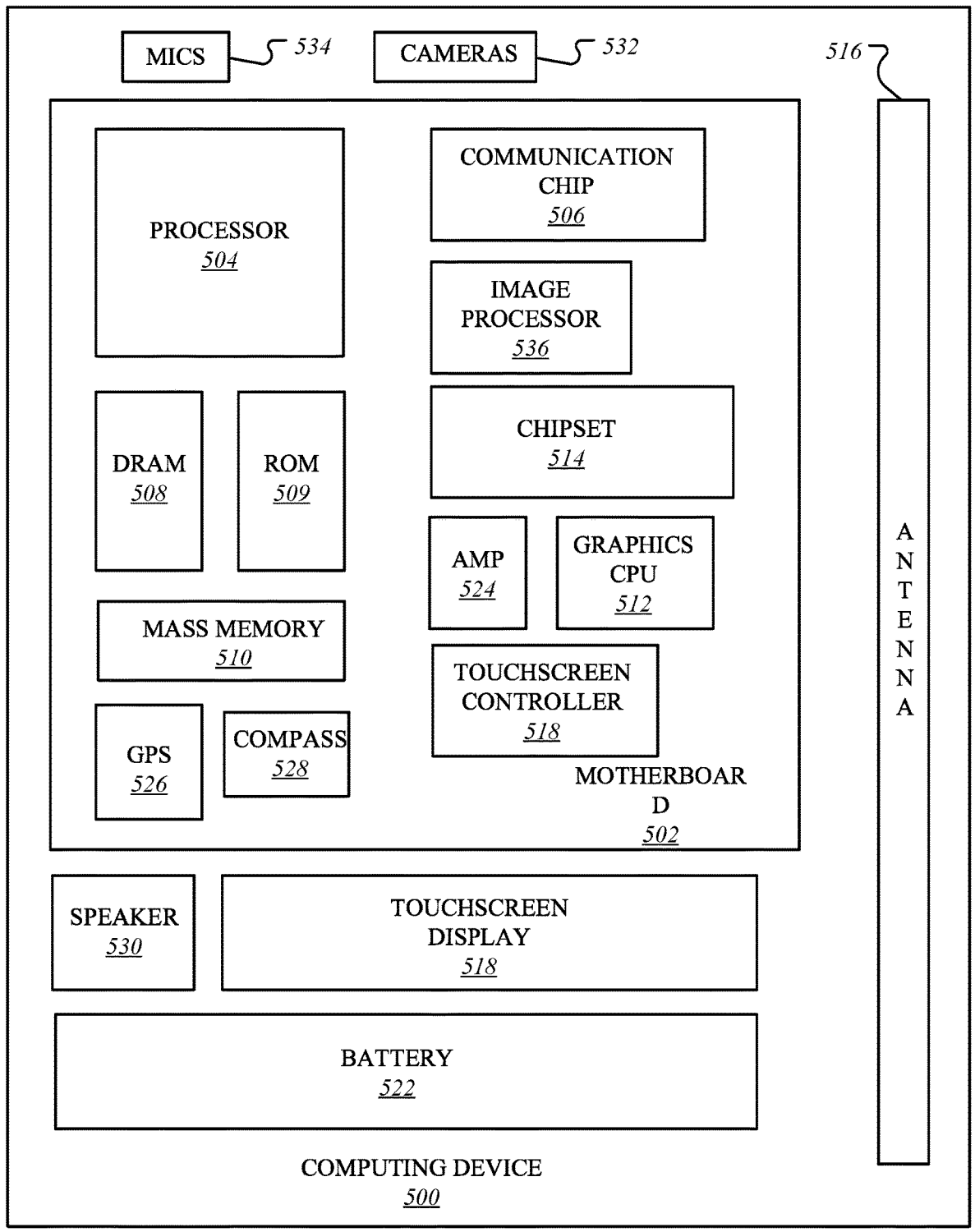
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
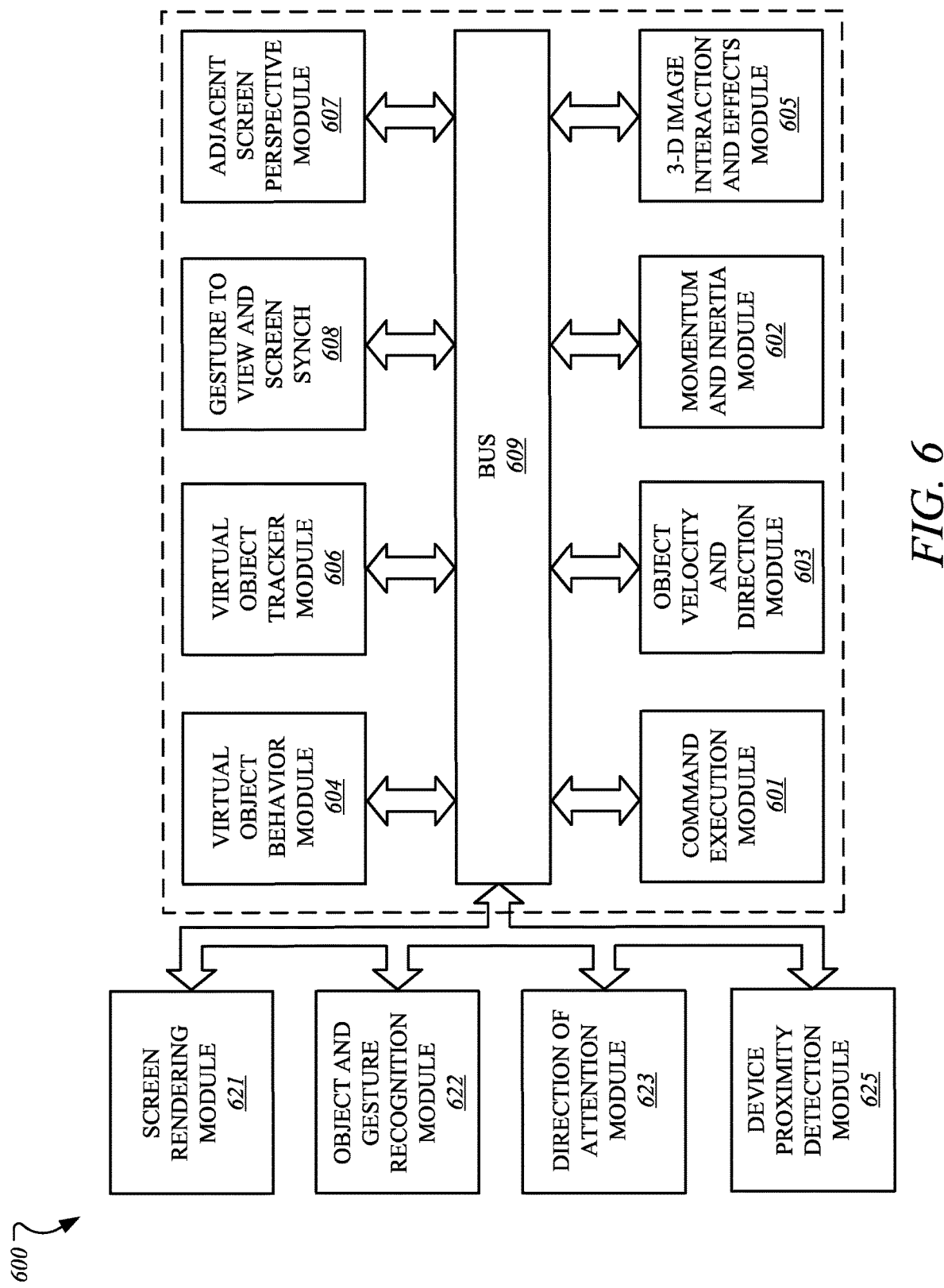
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers.

The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605, 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate deep learning-based real-time detection and correction of compromised sensors in autonomous machines, the apparatus comprising: detection and capturing logic to facilitate one or more sensors to capture one or more images of a scene, wherein an image of the one or more images is determined to be unclear, wherein the one or more sensors include one or more cameras; and classification and prediction logic to facilitate a deep learning model to identify, in real-time, a sensor associated with the image.

Example 2 includes the subject matter of Example 1, further comprising concatenation logic to receive one or more data inputs associated with the one or more images to concatenate the one or more data inputs into a single data input to be processed by the deep learning model, wherein the apparatus comprises an autonomous machine includes one or more of a self-driving vehicle, a self-flying vehicle, a self-sailing vehicle, and an autonomous household device.

Example 3 includes the subject matter of Examples 1-2, further comprising training and inference logic to facilitate the deep learning model to receive the single data input to perform one or more deep learning processes including a training process and an inferencing process to obtain real-time identification of the sensor associated with the unclear image, wherein the sensor includes a camera.

Example 4 includes the subject matter of Examples 1-3, wherein the training and inferencing logic is further to facilitate the deep learning model to receive a plurality of data inputs and run the plurality of data inputs through the training and inferencing processes such that the real-time identification of the sensor is accurate and timely.

Example 5 includes the subject matter of Examples 1-4, wherein the deep learning model comprises one or more neural networks including one or more convolutional neural networks, wherein the image is unclear due to one or more of a technical defect with the sensor or a physical obstruction of the sensors, wherein the physical obstruction is due to a person, a plant, an animal, or an object obstructing the sensor, or dirt, stains, mud, or debris covering a portion of a lens of the sensor.

Example 6 includes the subject matter of Examples 1-5, wherein the clarification and prediction logic to provide one or more of real-time notification of the unclear image, and real-time auto-correction of the sensor.

Example 7 includes the subject matter of Examples 1-6, wherein the apparatus comprises one or more processors having a graphics processor co-located with an application processor on a common semiconductor package.

Some embodiments pertain to Example 8 that includes a method facilitating deep learning-based real-time detection and correction of compromised sensors in autonomous machines, the method comprising: facilitating one or more sensors to capture one or more images of a scene, wherein an image of the one or more images is determined to be unclear, wherein the one or more sensors include one or more cameras of a computing device; and facilitating a deep learning model to identify, in real-time, a sensor associated with the image.

Example 9 includes the subject matter of Example 8, further comprising receiving one or more data inputs associated with the one or more images to concatenate the one or more data inputs into a single data input to be processed by the deep learning model, wherein the apparatus comprises an autonomous machine includes one or more of a self-driving vehicle, a self-flying vehicle, a self-sailing vehicle, and an autonomous household device.

Example 10 includes the subject matter of Examples 8-9, further comprising facilitating the deep learning model to receive the single data input to perform one or more deep learning processes including a training process and an inferencing process to obtain real-time identification of the sensor associated with the unclear image, wherein the sensor includes a camera.

Example 11 includes the subject matter of Examples 8-10, wherein the deep learning model is further to receive a plurality of data inputs and run the plurality of data inputs through the training and inferencing processes such that the real-time identification of the sensor is accurate and timely.

Example 12 includes the subject matter of Examples 8-11, wherein the deep learning model comprises one or more neural networks including one or more convolutional neural networks, wherein the image is unclear due to one or more of a technical defect with the sensor or a physical obstruction of the sensors, wherein the physical obstruction is due to a person, a plant, an animal, or an object obstructing the sensor, or dirt, stains, mud, or debris covering a portion of a lens of the sensor.

Example 13 includes the subject matter of Examples 8-12, further comprising providing one or more of real-time notification of the unclear image, and real-time auto-correction of the sensor.

Example 14 includes the subject matter of Examples 8-13, wherein the computing device comprises one or more processors having a graphics processor co-located with an application processor on a common semiconductor package.

Some embodiments pertain to Example 15 that includes a data processing system comprising a computing device having memory coupled to a processing device, the processing device to: facilitate one or more sensors to capture one or more images of a scene, wherein an image of the one or more images is determined to be unclear, wherein the one or more sensors include one or more cameras of a computing device; and facilitate a deep learning model to identify, in real-time, a sensor associated with the image.

Example 16 includes the subject matter of Example 15, wherein the processing device is further to receive one or more data inputs associated with the one or more images to concatenate the one or more data inputs into a single data input to be processed by the deep learning model, wherein the apparatus comprises an autonomous machine includes one or more of a self-driving vehicle, a self-flying vehicle, a self-sailing vehicle, and an autonomous household device.

Example 17 includes the subject matter of Examples 15-16, wherein the processing device is further to facilitate the deep learning model to receive the single data input to perform one or more deep learning processes including a training process and an inferencing process to obtain real-time identification of the sensor associated with the unclear image, wherein the sensor includes a camera.

Example 18 includes the subject matter of Examples 15-17, wherein the deep learning model is further to receive a plurality of data inputs and run the plurality of data inputs through the training and inferencing processes such that the real-time identification of the sensor is accurate and timely.

Example 19 includes the subject matter of Examples 15-18, wherein the deep learning model comprises one or more neural networks including one or more convolutional neural networks, wherein the image is unclear due to one or more of a technical defect with the sensor or a physical obstruction of the sensors, wherein the physical obstruction is due to a person, a plant, an animal, or an object obstructing the sensor, or dirt, stains, mud, or debris covering a portion of a lens of the sensor.

Example 20 includes the subject matter of Examples 15-19, wherein the processing device is further to provide one or more of real-time notification of the unclear image, and real-time auto-correction of the sensor.

Example 21 includes the subject matter of Examples 15-20, wherein the computing device comprises one or more processors having a graphics processor co-located with an application processor on a common semiconductor package.

Some embodiments pertain to Example 22 that includes an apparatus to facilitate simultaneous recognition and processing of multiple speeches from multiple users, the apparatus comprising: means for facilitating one or more sensors to capture one or more images of a scene, wherein an image of the one or more images is determined to be unclear, wherein the one or more sensors include one or more cameras; and means for facilitating a deep learning model to identify, in real-time, a sensor associated with the image.

Example 23 includes the subject matter of Example 22, further comprising means for receiving one or more data inputs associated with the one or more images to concatenate the one or more data inputs into a single data input to be processed by the deep learning model, wherein the apparatus comprises an autonomous machine includes one or more of a self-driving vehicle, a self-flying vehicle, a self-sailing vehicle, and an autonomous household device.

Example 24 includes the subject matter of Examples 22-23, further comprising means for facilitating the deep learning model to receive the single data input to perform one or more deep learning processes including a training process and an inferencing process to obtain real-time identification of the sensor associated with the unclear image, wherein the sensor includes a camera.

Example 25 includes the subject matter of Examples 22-24, wherein the deep learning model is further to receive a plurality of data inputs and run the plurality of data inputs through the training and inferencing processes such that the real-time identification of the sensor is accurate and timely.

Example 26 includes the subject matter of Examples 22-25, wherein the deep learning model comprises one or more neural networks including one or more convolutional neural networks, wherein the image is unclear due to one or more of a technical defect with the sensor or a physical obstruction of the sensors, wherein the physical obstruction is due to a person, a plant, an animal, or an object obstructing the sensor, or dirt, stains, mud, or debris covering a portion of a lens of the sensor.

Example 27 includes the subject matter of Examples 22-26, further comprising means for providing one or more of real-time notification of the unclear image, and real-time auto-correction of the sensor.

Example 28 includes the subject matter of Examples 22-27, wherein the apparatus comprises one or more processors having a graphics processor co-located with an application processor on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:
1. An apparatus comprising:
one or more processors to:
capture, via one or more sensors associated with an image capturing device, one or more images of a scene, wherein an image of the one or more images is determined to be an unclear image when it is obscured or indecipherable due to one or more technical defects associated with a sensor or a physical obstruction obscuring the sensor;
receive one or more data inputs associated with the one or more images to concatenate the one or more data inputs into a single data input to be processed by a deep learning model, wherein the one or more data inputs are collected from the one or more sensors and concatenated into the single data input prior to being processed by the deep learning model;
classify data associated with the processed single data input to generate results including one or more of identifying the sensor being defective or obstructed, notifying the sensor being identified as defective or obstructed, wherein the sensor identified as defective or obstructed is further classified as a compromised sensor;

auto-correct, on-the-fly, based on identifying and notifying of the sensor being defective or obstructed, the defective or obstructed sensor associated with the unclear image such that the sensor is auto-corrected to overcome a technical defect or the physical obstruction without interruption and while one or more tasks associated with the image capturing device are in progress, wherein auto-correcting includes real-time and on-the-fly issuing of one or more alerts to warn and real-time and on-the-fly fixing of the compromised sensor; and receive the single data input to perform one or more deep learning processes including a training process and an inferencing process to obtain real-time identification of the sensor associated with the unclear image, wherein the results including the real-time identification of the sensor being defective or obstructed are propagated with weight updates to predict one or more technical defects associated with the one or more sensors, wherein the one or more technical defects are at least partially responsible for the sensor being detective or obstructed.

2. The apparatus of claim 1, wherein the deep learning model comprises one or more neural networks including one or more convolutional neural networks, wherein the physical obstruction is due to a person, a plant, an animal, or an object obstructing the sensor, or dirt, stains, mud, or debris covering a portion of a lens of the sensor.

3. The apparatus of claim 1, wherein the apparatus comprises an autonomous machine includes one or more of a self-driving vehicle, a self-flying vehicle, a self-sailing vehicle, or an autonomous household device, wherein the image capturing device includes a camera, wherein the one or more processors comprise a graphics processor co-located with an application processor on a common semiconductor package.

4. A computer-implemented method comprising:

capturing, via one or more sensors associated with an image capturing device associated with a computing device, one or more images of a scene, wherein an image of the one or more images is determined to be an unclear image when it is obscured or indecipherable due to one or more technical defects associated with a sensor or a physical obstruction obscuring the sensor;

receiving one or more data inputs associated with the one or more images to concatenate the one or more data inputs into a single data input to be processed by a deep learning model, wherein the one or more data inputs are collected from the one or more sensors and concatenated into the single data input prior to being processed by the deep learning model;

classifying data associated with the processed single data input to generate results including one or more of identifying the sensor being defective or obstructed, notifying the sensor being identified as defective or obstructed, wherein the sensor identified as defective or obstructed is further classified as a compromised sensor;

auto-correcting, on-the-fly, based on identifying and notifying of the sensor being defective or obstructed, identifying, in real-time, a sensor associated with the unclear image such that the sensor is auto-corrected to overcome a technical defect or the physical obstruction without interruption and while one or more tasks associated with the image capturing device are in progress, wherein auto-correcting includes real-time and on-the-fly issuing of one or more alerts to warn and real-time and on-the-fly fixing of the compromised sensor; and receiving the single data input to perform one or more deep learning processes including a training process and an inferencing process to obtain real-time identification of the sensor associated with the unclear image, wherein the results including the real-time identification of the sensor being defective or obstructed are propagated with weight updates to predict one or more technical defects associated with the one or more sensors, wherein the one or more technical defects are at least partially responsible for the sensor being detective or obstructed.

5. The computer-implemented method of claim 4, wherein the computing device comprises an autonomous machine includes one or more of a self-driving vehicle, a self-flying vehicle, a self-sailing vehicle, or an autonomous household device, wherein the image capturing device includes a camera, wherein the deep learning model comprises one or more neural networks including one or more convolutional neural networks, wherein the physical obstruction is due to a person, a plant, an animal, or an object obstructing the sensor, or dirt, stains, mud, or debris covering a portion of a lens of the sensor.

6. The computer-implemented method of claim 4, wherein the computing device comprises one or more processors including a graphics processor co-located with an application processor on a common semiconductor package.

7. A non-transitory computer-readable medium having stored thereon instructions which, when executed, cause a computing device to perform operations comprising:

capturing, via one or more sensors associated with an image capturing device associated with the computing device, one or more images of a scene, wherein an image of the one or more images is determined to be an unclear image when it is obscured or indecipherable due to one or more of a technical defect associated with a sensor or a physical obstruction obscuring the sensor;

receiving one or more data inputs associated with the one or more images to concatenate the one or more data inputs into a single data input to be processed by a deep learning model, wherein the one or more data inputs are collected from the one or more sensors and concatenated into the single data input prior to being processed by the deep learning model;

classifying data associated with the processed single data input to generate results including one or more of identifying the sensor being defective or obstructed, notifying the sensor being identified as defective or obstructed, wherein the sensor identified as defective or obstructed is further classified as a compromised sensor;

auto-correcting, on-the-fly, based on identifying and notifying of the sensor being defective or obstructed, identifying, in real-time, a sensor associated with the unclear image such that the sensor is auto-corrected to overcome the technical defect or the physical obstruction without interruption and while one or more tasks associated with the image capturing device are in progress, wherein auto-correcting includes real-time and on-the-fly issuing of one or more alerts to warn and real-time and on-the-fly fixing of the compromised sensor; and receiving the single data input to perform one or more deep learning processes including a training process and an inferencing process to obtain real-time identification of the sensor associated with the unclear image, wherein the results including the real-time identification of the sensor being defective or obstructed are propagated with weight updates to predict one or more technical defects associated with the one or more sensors, wherein the one or more technical defects are at least partially responsible for the sensor being detective or obstructed.

8. The non-transitory computer-readable medium of claim 7, wherein the computing device comprises an autonomous machine includes one or more of a self-driving vehicle, a self-flying vehicle, a self-sailing vehicle, or an autonomous household device, wherein the computing device comprises one or more processors including a graphics processor co-located with an application processor on a common semiconductor package, wherein the image capturing device includes a camera.

9. The non-transitory computer-readable medium of claim 7, wherein the deep learning model comprises one or more neural networks including one or more convolutional neural networks, wherein the physical obstruction is due to a person, a plant, an animal, or an object obstructing the sensor, or dirt, stains, mud, or debris covering a portion of a lens of the sensor.

* * * * *